US008250096B2

(12) United States Patent
Su et al.

(10) Patent No.: US 8,250,096 B2
(45) Date of Patent: Aug. 21, 2012

(54) ACCESS TO TRUSTED USER-GENERATED CONTENT USING SOCIAL NETWORKS

(75) Inventors: Qi Su, Mountain View, CA (US); Wendell Baker, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1178 days.

(21) Appl. No.: 12/059,711

(22) Filed: Mar. 31, 2008

(65) Prior Publication Data
US 2009/0249451 A1 Oct. 1, 2009

(51) Int. Cl.
G06F 17/30 (2006.01)
G08F 17/30 (2006.01)

(52) U.S. Cl. ............. 707/783; 705/35; 705/43; 705/52; 705/39; 705/40; 705/59; 709/220; 709/221; 709/222; 709/223; 709/224; 709/225; 709/250; 709/214; 709/202; 726/4; 726/5; 726/26; 726/27; 726/28; 707/709; 707/708; 707/714; 707/758; 707/784; 707/710; 707/732; 707/767; 715/751; 725/110

(58) Field of Classification Search ........................ 726/5
See application file for complete search history.

(56) References Cited

U.S. PATENT DOCUMENTS

| 2005/0216300 A1* | 9/2005 | Appelman et al. ................ 705/1 |
| 2005/0216550 A1* | 9/2005 | Paseman et al. ............. 709/202 |
| 2006/0004691 A1 | 1/2006 | Sifry |
| 2007/0266023 A1 | 11/2007 | McAllister et al. |
| 2008/0005282 A1 | 1/2008 | Gaedcke ....................... 709/219 |

FOREIGN PATENT DOCUMENTS

KR 10-0724645 B1 6/2007

* cited by examiner

Primary Examiner — Nathan Flynn
Assistant Examiner — Bryan Wright
(74) Attorney, Agent, or Firm — Martine Penilla Group, LLP

(57) ABSTRACT

A method to access trusted user generated content (UGC) is provided. User registration information containing one or more identities is obtained. Each identity corresponds to an internet social network that is facilitated by one of a plurality of social network sites. The social relationships are collected using the provided user identities at the different social network sites and user extended social networks are created for each user by joining the social relationships collected. Then, UGC is collected from the plurality of social network sites and the collected UGC is correlated with the extended social networks. The correlated UGC is filtered according to the user configuration of a user making a request, and then the results are presented to the requesting user. A search function is provided to obtain information on demand, or alternatively, a user receives feeds of information according to configured information regarding the user's extended social network.

25 Claims, 7 Drawing Sheets

402 404

| | |
|---|---|
| Keywords | |
| Category 406 | Travel ▼<br>Restaurant<br>Product review<br>Dating<br>Valentine Day<br>Gossip |
| Relation 408 | Friends ▼<br>Friends of friends<br>World<br>My network |
| Site 410 | Facebook ▼<br>Y!Travel<br>MySpace |
| Date 412 | 3 days ▼<br>Last week<br>Last month<br>Last 3 months<br>Last year |
| Sort by | relevance 414 site  date |
| Author 416 | |
| Frequency 418 | Search now ▼<br>Daily<br>Weekly<br>Monthly |
| Author age range 420 | |

| AUTHOR | RELATION | SITE | DATE | CATEGORY |
|---|---|---|---|---|
| Bob123 | Friend (2) | Facebook | 1/15/2008 | Restaurant |

Picasso Steakhouse – Great atmosphere and very good food with a Spanish flavor. Centric downtown location in San Jose's San Pedro square close to convenient parking ...    More

ACCESS TO TRUSTED USER-GENERATED CONTENT USING SOCIAL NETWORKS

BACKGROUND

1. Field of the Invention

The present invention relates to methods, computer programs and systems for providing User-Generated Content (UGC), such as ratings and reviews, which is trusted by internet users.

2. Description of the Related Art

Internet users are interested in user generated content, such as product and service ratings and reviews, but performing a comprehensive search for such content requires significant effort and time. Furthermore, it is difficult to determine what content is trustworthy. Today, user generated content is fragmented across many websites. For example, ratings and reviews for hotels are available from Yahoo!™ Travel, Frommer's™, Expedia™, etc. In the restaurant area, ratings and reviews are available from Yahoo!™ Local, Yelp™, etc. In the online shopping area, product ratings and reviews are available from Yahoo!™ Shopping, Epinions™, CNET™, etc.

There is no easy method of searching across these siloed sites. For example, a user interested in information about San Francisco hotels has essentially two options: searching for "San Francisco hotel reviews" on a web search engine such as Yahoo!™, or searching individual websites containing travel information, such as Yahoo!™ Travel and TripAdvisor™. The first option requires filtering out irrelevant entries in the search result. The second option is time consuming because it requires searching a plurality of websites, one at a time. Furthermore, the second option requires that the user be aware of all the major websites for the particular area of interest, such as travel or hotels in the examples mentioned above.

Additionally, there are vast amounts of available user generated content, complicating the problem of finding the right information because of the stringent filtering required to get relevant information. For example, if a user is looking for dining ideas in San Francisco, where should the user start? There are reviews for hundreds to thousands of restaurants and tens of cuisine styles in San Francisco on each of the major content sites. If the user is looking for general ideas, the search criteria is left wide open making it difficult for a search mechanism to find the desired information according to the user intent.

Another problem confronting a user looking for ratings and reviews is that ratings and reviews are essentially anonymous. For each review, there is usually a username shown, but typically the content reader does not know the identity associated with a username and therefore there is no basis on which to judge the trustworthiness of the author and her reviews. User-generated content can be very biased. For example, typically only residents with negative experiences post on apartment rating sites. In contrast, some hotel review sites have been known to have hotel staff anonymously post positive comments about their own hotels.

Another aspect of getting good UGC is that the information posted is only as good as the level of expertise of the author. To be up-to-date in certain areas, users must spend considerable effort to keep up with a product or service category. For example, tech gadgets and fashion are two areas that require significant time, research effort, and taste, to keep up-to-date with trends. Most people do not have the time required to keep up with the changes. However, people often have friends that have the expertise desired and whose opinion is highly valued. Today, there is no easy way to access content generated by a user's friends. The only way is to email links identifying content locations.

It is in this context that embodiments of the invention arise.

SUMMARY

The problems previously described can be solved by using social networks, such as Yahoo!™ Mash™, Yahoo!™360, Facebook™ or Myspace™, to organize user generated content currently fragmented across many web sites.

Embodiments of the present invention provide methods, computer programs and systems to access trusted User Generated Content (UGC). Information from social networks is used to identify user's extended social networks that encompass multiple social networks. UGC is provided to internet users based on the extended social networks of the user and the user's social peers.

It should be appreciated that the present invention can be implemented in numerous ways, such as a process, an apparatus, a system, a device or a method on a computer readable medium. Several inventive embodiments of the present invention are described below.

In one embodiment, a method to access trusted user generated content (UGC) is provided. The method includes receiving user registration information that has one or more identities for each user. Each identity corresponds to a social network that is facilitated by one of a plurality of social network sites. Then, collecting the social relationships corresponding to the identities for each user in the plurality of social network sites, and creating user extended social networks for each user by joining the social relationships collected. The method further includes, collecting UGC from the plurality of social network sites and correlating the collected UGC with the extended social networks. The method filters the correlated UGC according to a user configuration of a requesting user, and provides content that is available for presentation on a display.

In another embodiment, a search function is provided to obtain information on demand. In another embodiment, users subscribe to feeds of information according to configured information regarding the user's extended social network.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4A shows a search user interface to access UGC in one embodiment.

FIG. 4B shows a sample UGC being displayed to a user, in one embodiment.

DETAILED DESCRIPTION

Figure 1:
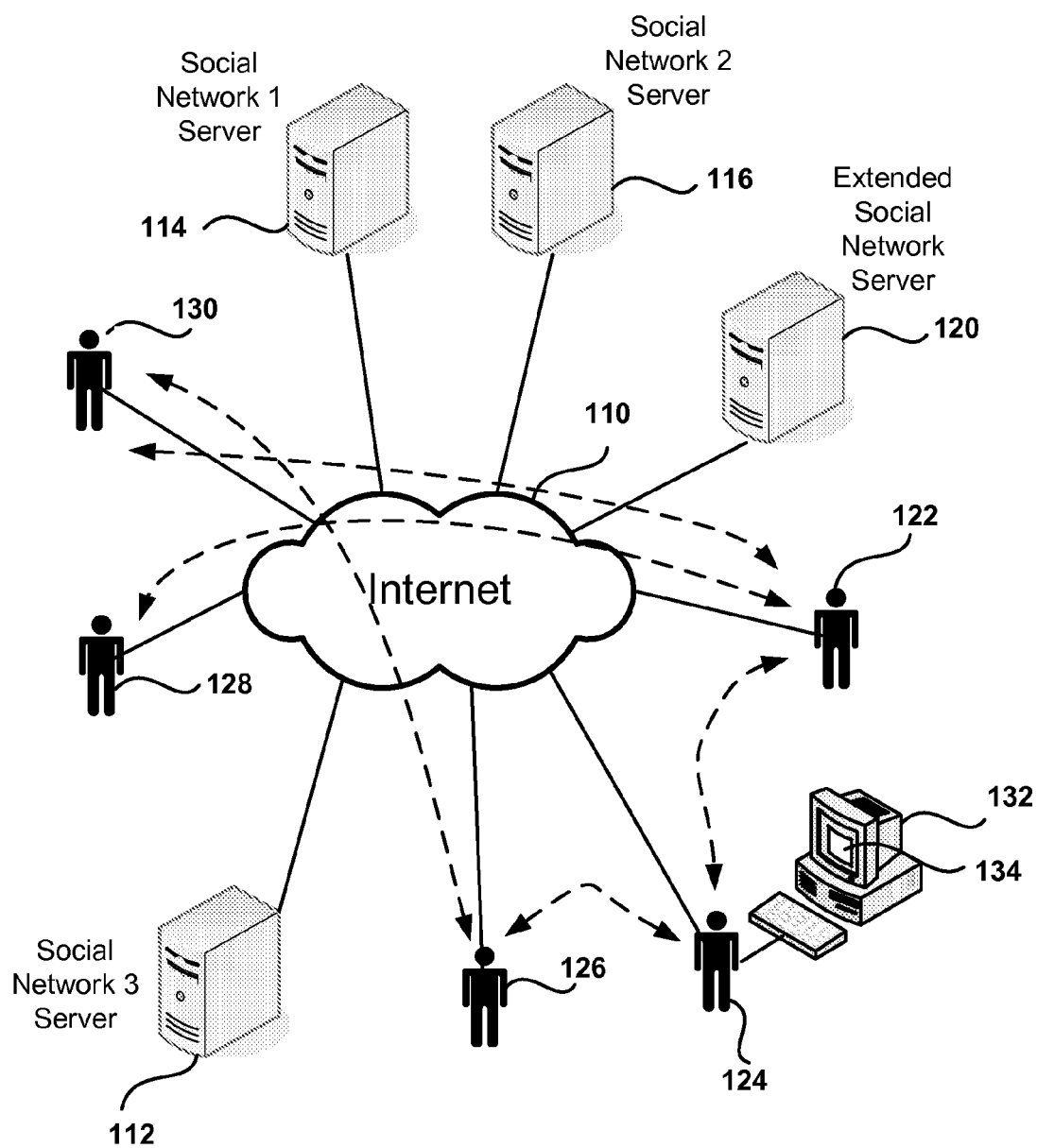
FIG. 1 describes an internet environment where users access social network information.

In the internet arena, social networks are online social structures for communities of people who share interests and activities, or who are interested in exploring the interests and activities of others, and which necessitates the use of software. Internet social networks are often implemented by internet social network service providers that build and verify the social networks. Most services are primarily web based and provide a collection of various ways for users to interact, such as chat, messaging, email, video, voice chat, file sharing, blogging, discussion groups, etc.

The main types of social networking services are those which contain: directories of some categories, such as former classmates; means to connect with friends, usually containing self-description pages; and recommender systems linked to trust. Some examples of social networking sites are Yahoo! Groups™, MySpace™, Bebo™, Facebook™, Hi5™, Google's Orkut™, and Friendster™.

A method to access trusted user generated content (UGC) is provided. User registration information containing one or more identities is obtained. The identities correspond to different internet social networks that are facilitated by social network service providers, where each service is associated with an internet social network site. The social relationships in each social network are collected using the provided user identities and user extended social networks are created for each user by joining the social relationships collected. Joining social relationships includes identifying the multiple identities of a single user in the different social networks and then merging the user's social networks into one extended social network that includes all the relationships scattered throughout the different social networks.

Then, UGC is collected from the plurality of social network sites and the collected UGC is correlated with the extended social networks, including identifying the owners of content according to the extended social networks of registered users. The correlated UGC is filtered according to the user configuration of a user making a request, and then the results are presented to the requesting user. The results can be shown to the user in a variety of ways, such as on a display using a web browser, email, instant messaging, etc. The display can be, for example, part of a computer system or a mobile phone.

A search function is provided to enable users to obtain information on demand. Alternatively, users can subscribe to feeds of information according to a configuration regarding the user's extended social network.

In another embodiment, a system to access trusted UGC includes a plurality of social network sites, and a registration server to receive user registration information. The registration information including one or more identities for each user in a plurality of social network sites. The system also includes a crawler to collect UGC and social relationships corresponding to the identities for each user from the plurality of social network sites, and a user metadata database that contains user extended social networks. The user extended social networks are created by joining the collected social relationships, and the collected UGC is correlated with the extended social networks.

The system further includes a user content database including the UGC obtained by the crawler, a search engine to filter the correlated UGC, and a display to provide the content to the requesting user.

It will be obvious, however, to one skilled in the art, that the present invention may be practiced without some or all of these specific details. In other instances, well known process operations have not been described in detail in order not to unnecessarily obscure the present invention.

FIG. 1 describes an internet environment where users access social network information. A plurality of social network sites is available on Internet 110. Each social site is hosted by one or more Social Network Servers 112, 114, and 116. Users 122, 124, 126, 128, and 130 belonging to the social networks create relationships on the social networks that link them to other users. A few sample relationships are shown in FIG. 1 by the dotted arrows joining user 122 to 124, 128 and 130; user 124 to 122 and 126; user 126 to 124 and 130; etc.

Extended Social Network Server 120 allows users to register their identities from the different social networks and merge the different social groups into one large extended social network. More details on the architecture of Extended Social Network Server 120 are shown below with respect to FIGS. 5 and 6.

Users create content in the different social network sites. Ratings, reviews, and wishlists are some of the popular ways of creating user generated content. For example, in the areas of photo sharing and blogs, Flickr™ and Xanga™ both have built-in social networks. To share Flickr™ photos or Xanga™ blogs, potential viewers need to be registered users and need to either be flagged as friends of the author or have subscribed to the author's content on each site. This procedure must be repeated on every closed content system. In contrast, according to one embodiment, the social relationship only needs to be registered once. In the example mentioned above, each user registers his Flick™ and Xanga™ identities and the sharing happens automatically. Furthermore, a user's friends are not required to register on Flickr or Xanga in order to subscribe to updates of the user's content. Once the relationship is established once, all the content generated by a user in any social network site is made available to her friends, or in other words, all those that are linked to the user via any social network.

Typically users access content via browser 134 running on a computer display 132. In other embodiments, content may be available via a mobile phone, laptop, handheld computer, etc., via browser, email, blogs, feeds, etc.

Figure 2:
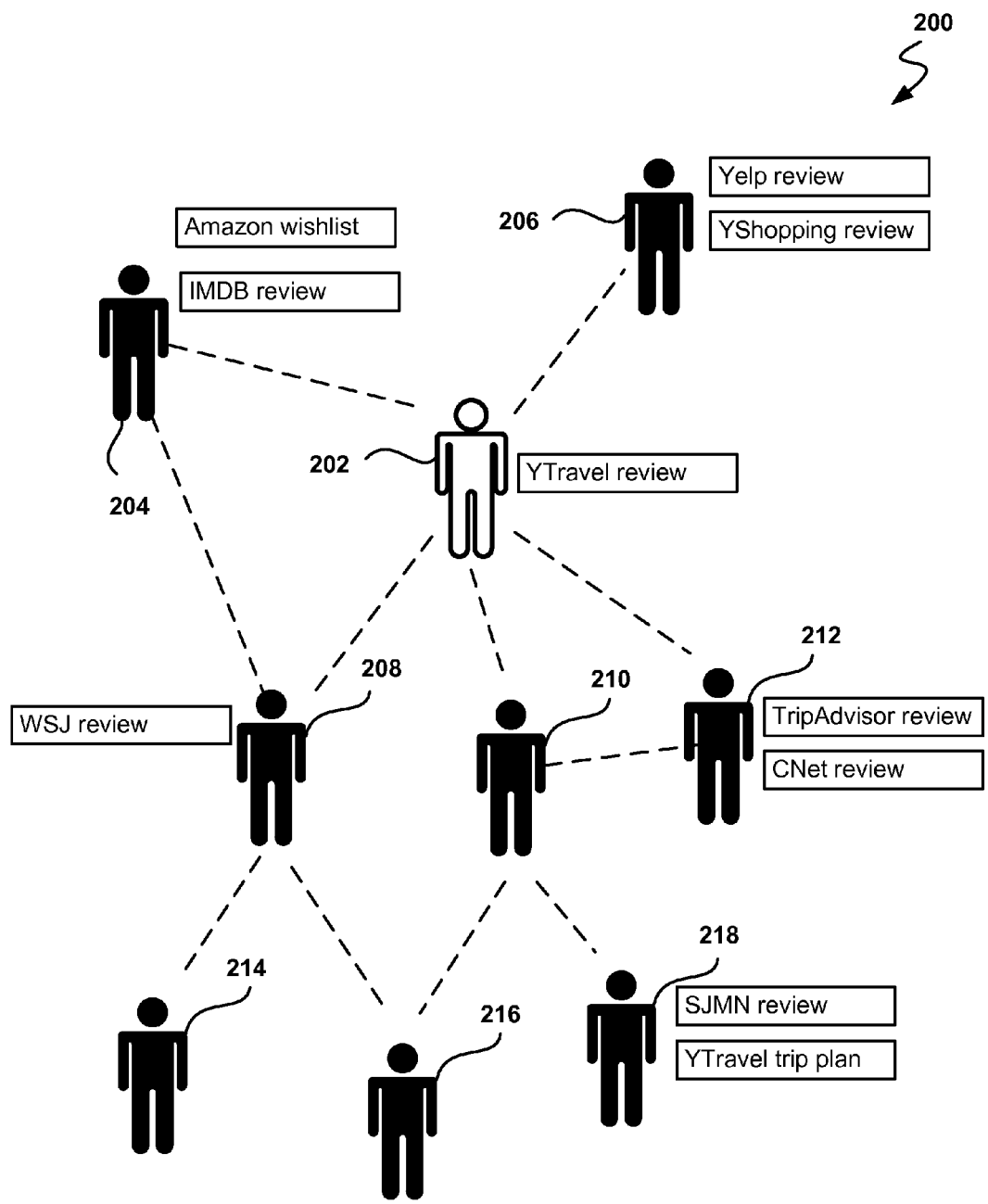
FIG. 2 shows user social relationships and user-generated content.

FIG. 2 shows user social relationships and user-generated content. FIG. 2 illustrates the concept of imposing social networking over user generated content that is currently fragmented across disparate websites. In this diagram, user 202 has 5 friends 204, 206, 208, 210 and 212, and three friends-of-friends 214, 216 and 218 who have produced various types of content at various sites. User 202 can search or browse the content generated by his friends, friends of friends, etc., or any subset thereof. In this example, user 202 can access content from user 202 friends, such as Amazon™ wishlist, Yelp™ review, Wall Street Journal™ (WSJ) review, Yahoo!™ Shopping review, etc., or content from friends-of-friends such as the one created by user 218, San Jose Mercury News (SJMN) review, or Yahoo!™ Travel trip plan.

Figure 3:
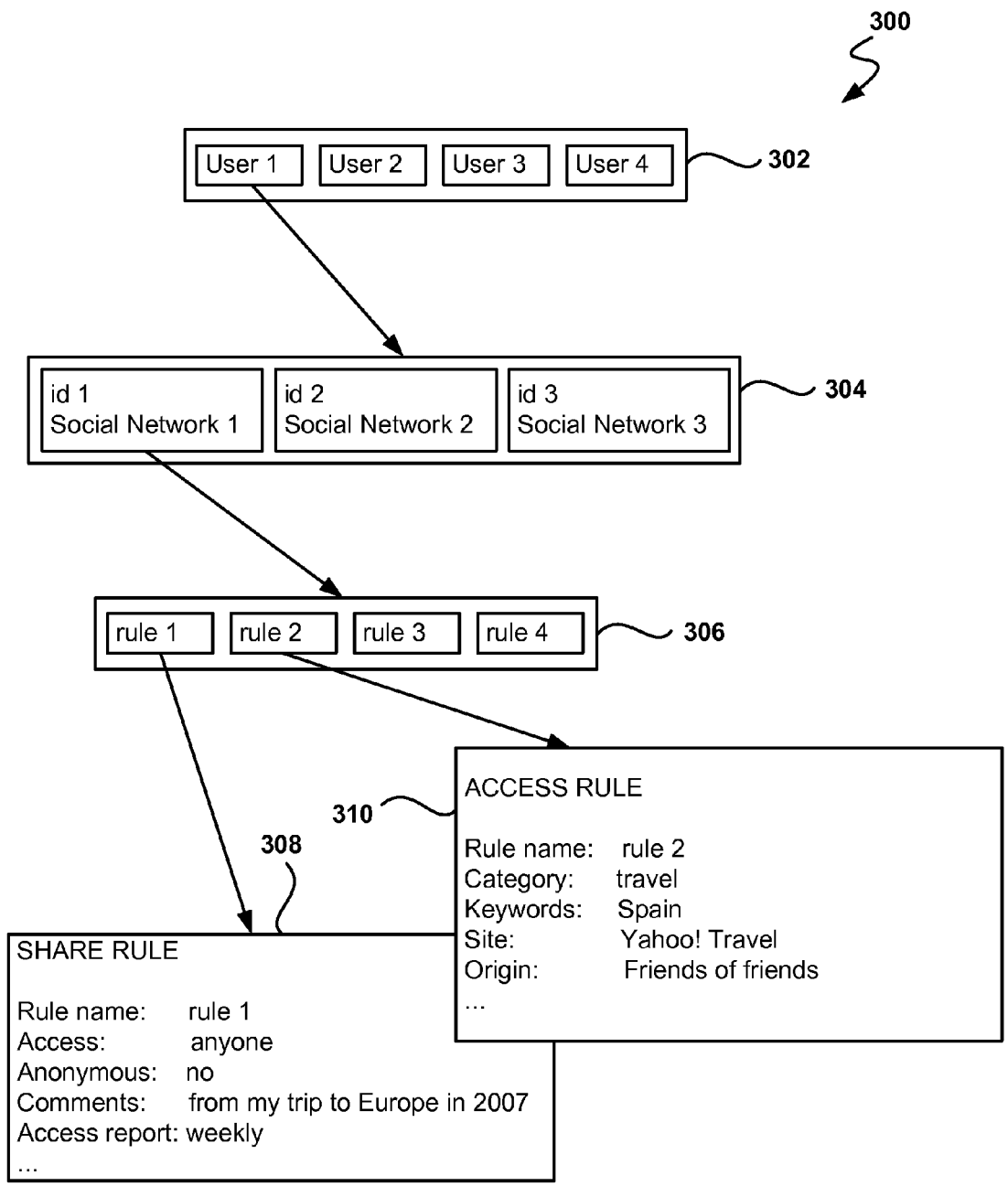
FIG. 3 depicts how to correlate identities from different social networks and rules to access or share information according to one embodiment.

FIG. 3 depicts how to correlate identities from different social networks and rules to access or share information according to one embodiment. The person skilled in the art will easily appreciate that this is one example for organizing the information in Extended Social Network Server 120 from FIG. 1, but other data structures can be used as long as the principles described in this application are maintained.

Initially users register 302 in the Extended Social Network Server. In another embodiment, the extended social network structure is implemented on top of an existing social network site, and thus registration would not be required for those users that are already part of the social network site.

Each user registers her identities in one or more social sites. In FIG. 3, User 1 registers 304 id 1 for Social Network 1, id 2 for Social Network 2, and id 3 for Social Network 3. Users can subscribe to feeds of content according the user's interests, or do ad-hoc searches on the user generated content across all or any subset of the user generated content hosting websites known to the system. Ongoing feeds of information are saved in the system as Access Rules 310, which define parameters related to authoring, category, keywords, site, origin, etc.

Privacy is an important consideration for many users. The system allows the user (owner of user generated content) to specify what and to whom to share. In one embodiment, sharing is specified by the following parameters: content, sharing target, and identification option. The content component specifies a subset of the user's content and can include all content, content in a given category (e.g. all my restaurant reviews), or content in one site (e.g. all my Yelp reviews). Sharing target specifies the friends to share the given content with, e.g. "all friends of friends", "all friends", or "Alice and Bob". Identification option specifies whether to display the content owner's identity to the sharing target. Suppose Bob123 is sharing his yelp.com reviews with Alice. If Bob123 chooses not to share his identity, then Alice will see Bob123's yelp.com reviews marked as reviews of a friend. Also, if Alice searches for content authored by Bob123, then no results will be returned. If Bob123 chooses to share his identity, then Alice will see Bob123's identity associated with Bob123's reviews.

These limitations on sharing are stored as Share Rules 308. Additionally, rules can enable sharing within a category of content generated by the user, such as "make public all my book purchases," or impose specific restrictions on what can not be shared, such as "do not share my purchase on a book related to cancer in Yahoo! Shopping."

FIG. 4A shows a search user interface 402 to access UGC in one embodiment. An input window 404 allows the user to specify keywords to delimit the content of interest. Other search parameters are available, such as category 406, relation 408, site 410, date 412, result sorting 414, author 416, frequency 418, and author age range 420. In other embodiments, a subset of these parameters is offered to the user, or additional search parameters can be added to further delimit the search.

Search options can be entered via pull-down menus (406, 408, 410, 412, and 418), input fields (404, 416, and 420), buttons (414), etc. In other embodiments, search options can be provided in different formats, according to the requirements of the developer. FIG. 4A shows a search window that can be used both for searching content or subscribing to feeds. In other embodiments, search windows for on-demand searching have different interfaces than feed subscription windows. A user requesting 'monthly' in frequency 418 field will cause the Extended Social Network Server to create a feed subscription for the user. On the other hand, a user selecting 'Search now' will cause the Server to perform an instant search according to the given parameters.

FIG. 4B shows a sample UGC 424 being displayed to a user, in one embodiment. Headings 422 row shows the fields for the UGC displayed below. In this embodiment, author, relation, site, date and category are shown. UGC results 426 are shown in the form of a list. Each entry in the list has a header row and a UGC summary. The header row describes the items corresponding to headings 422 row. For example, Friends (2) means that author Bob123 is a friend of depth 2, or in other words, a friend of a friend. In this embodiment, the requester is able to specify the depth of search as friends, friends and friends of friends, etc. Due to the exponential nature of the expanding the circle of friends as the depth grows, a practical limit of 3 for the depth search is applied.

Within content 426, the UGC is displayed following the headers. In this embodiment, only the beginning of the UGC is shown with the option of a link to see the rest, while in other embodiments the complete UGC is shown.

Figure 5:
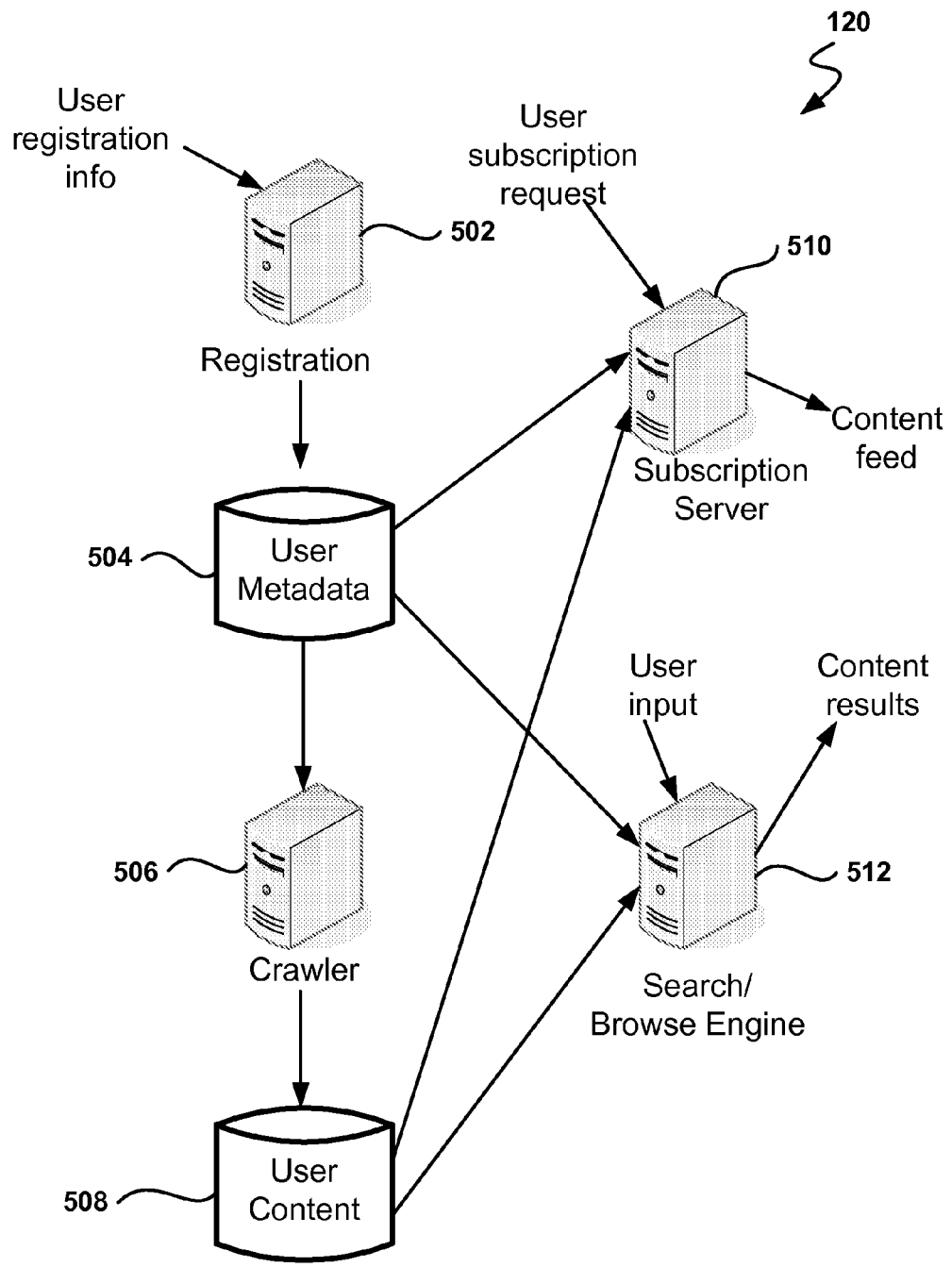
FIG. 5 describes the architectural components in one embodiment of the Extended Social Network Server.

FIG. 5 describes the architectural components according to one embodiment of Extended Social Network Server 120. It should be noted that this system can be implemented as a component of an existing social network (e.g. Yahoo! Mash, Facebook, etc), or as a light weight social network. If the system is part of an existing social network, then the system is already aware of the social network structure. The user would register his identities on external content sites in registration server 502 and specify what type of content from the user to be shared with what subset of friends (e.g. share all my content with all my immediate friends; allow only Alice and Bob to subscribe to my content; share only my content on Yelp to friends of friends and do not show my identity with the content), etc. If the system is not part of an existing social network, then a new social network is created and users would also register their friends, which could for example be identified by their email addresses.

Registration server 502 generates user metadata that incorporates the different user identities in the plurality of social networks. Crawler 506 accesses the different social networks and finds the friends of the registered user. The information is joined together to form an extended social network, as described below with respect to FIG. 6. Crawler 506 also accesses content sites searching for content. For each piece of content retrieved, the site specific author identity (e.g. yelp id of the author of a yelp review) is extracted and associated with the content. Crawler 506 also schedules itself to crawl regularly in order to detect new content. Some content sites have Application Program Interfaces (API) that can be used to retrieve content rather than running a brute force web crawl on the site. The content found by crawler 506 is stored in User Content database 508.

Search/Browse Engine 512 provides a user interface to search or browse the UCC collected by the crawler. In a first mode, Search/Browse Engine 512 performs general searches of UGC that do not make use of the user's social network. Search/Browse Engine 512 works with the full collection of UGC collected by the crawler. The user may perform keyword queries (e.g. "San Francisco hotels", "apple iphone"), optionally include parameters such as categories (e.g. hotels), content creation date (e.g. 6 month old or less), site sources (e.g. only Y Travel and Yelp), etc., as previously described with respect to FIG. 4A. If the UGC is shared by a friend, the friend's identity is shown next to the content.

In a second mode, Search/Browse Engine 512 only searches UGC produced by the user's social network. The user has the option of being more or less restrictive (e.g. friends of friends, or only specific immediate friends). It should be noted that in this mode, the system would only show content that has been shared by the content-producing friend with this user.

Subscription Server 510 enables users to subscribe to content and receive feeds containing UGC of interest. Interest can be indicated by a keyword query (e.g. "San Francisco hotels", "apple iphone"), a category (e.g. hotels), a social network range (e.g. all content, all friends, specific friends), and site or sites. After the crawler completes a regularly scheduled crawl, the subscription server 510 executes all the user interest requests. If a given request produces new content results, the new results are saved in a database, or transmitted to the subscriber.

Subscription Server 510 can also generate recommendations using collaboration techniques. Traditional collaborative filtering techniques work by finding users among a large set of users deemed to be "similar" to the requester, and then looking at what the "similar" users prefer to make recommendations to the requester. For example, Yahoo! Music compares music preferences and ratings from millions of users in order to compute recommendations. These millions of users are anonymous, and hence untrustworthy. A person is often more interested in recommendations from known people rather than recommendations from strangers. Subscription Server 510 is able to efficiently narrow down the set of users to be used for recommendation computation to those users relatively close to the requester in real life (e.g. friends, or friends of friends). Hence, recommendations may be more relevant, as well as more authoritative. For example, it is more relevant if friends of a requester suggest that the requester might like Jay-Z, than if millions of anonymous Yahoo! Music users suggest that the requester might like Jay-Z.

Subscription server 510 can also compute trend information by analyzing user activities. For example, a user may be alerted than two of her friends recently wrote reviews about restaurant X in San Francisco, or that Transformers is the highest rated movie by the user's friends.

The Extended Social Network Server 120 shown in FIG. 5 can also generate behavioral data. The components previously described rely on user generated content that is publicly available on the Internet. If Server 120 is operated by the same entity as a content website, then Server 120 can leverage non-publicly available behavioral information logged by the content website servers. If Server 120 has access to product reviews in a shopping site, then Server 120 can access user behavior data in shopping site, such as product purchase or page-viewing history. Server 120 utilizes this information and makes the information available to users in the social network of a given user. For example, the system could show trends (three friends recently looked at the Apple iPhone product page), and the system would allow users to do searches related to purchasing in the shopping site (find friends who have purchased the Apple iPhone). This is also available for non-user generated content sites. For example, if users allow sharing their news story browsing history, then the system can recommend news stories to other users based on user friends' browsing histories.

Figure 6:
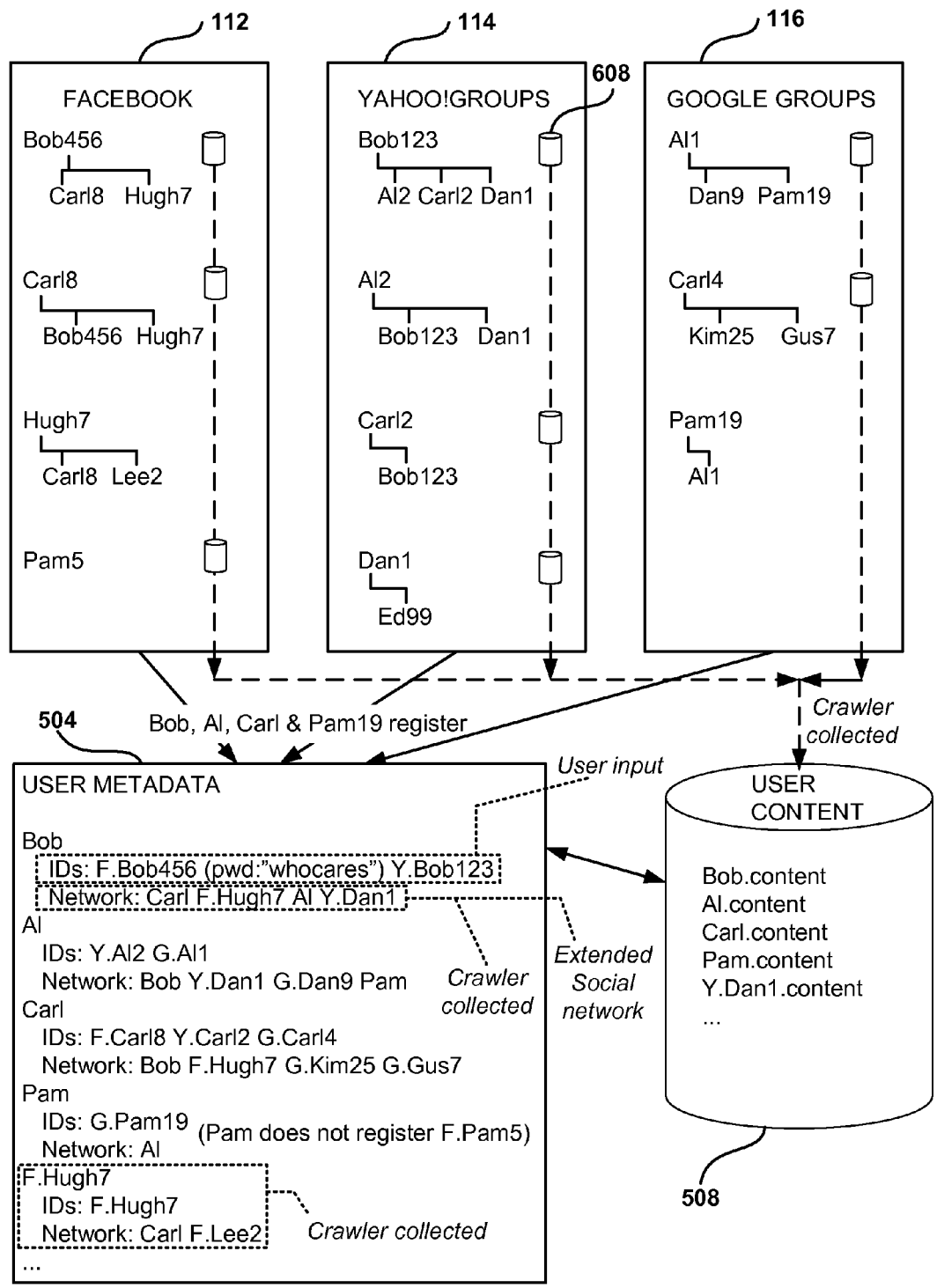
FIG. 6 depicts the processes of joining social information from different networks and collecting UGC.

FIG. 6 depicts the processes of joining social information from different networks and collecting UGC. Three social networks, Facebook 112, Yahoo! Groups 114, and Google Groups 116 have users and content to be captured by the Extended Social Network Server. Users have one or more identities in the social networks 112, 114, and 116. For description purposes only, user ids have been formed by adding a name to a number. Those ids with the same name but different number attached to the name represent different identities of the same user in different social networks. For example, Bob has identities Bob456 in Facebook 112, Bob123 in Yahoo! Groups 114, and no identity in Google Groups 116.

Below each user, those users that have been registered as friends are placed. For example, Bob123 has friends Al2, Carl2, and Dan1, all of them in the same social network 114. Additionally, some users have created content that is associated with their id, such as Bob123's UGC 608. In this case, users Bob, Al, Carl1 and Pam19 have registered into the extended social network. Pam has two ids, Pam5 and Pam19 but wishes to keep her identity Pam5 private so Pam only registers Pam19.

Crawler 506 shown in FIG. 5 collects the different relationships for the registered users and joins them together under the unique identity, as seen in user metadata 504 table. For example, Bob has registered identity Bob456 from Facebook 112 (noted as F.Bob456) giving his password ("whocares"), and Bob123 from Yahoo! Groups 114. Al has registered identities Al2 from Yahoo! and Al1 from Google Groups.

During the join process, the system uses the information related to multiplicity of identities from users, and their social networks, to create an extended social network. Here, Bob's network includes Carl (that has registered and listed all his identities, so there is no need to list all of Carl's identities), F.Hugh7 (found in Facebook, but since Hugh has not registered, the identity from Facebook is used), Al (registered), and Y.Dan1 (unregistered user found in Yahoo). Pam's network consists only of Al, which was found in Google. Pam5 is not in the system; therefore Pam has privacy with respect to that identity. F.Hugh7 was found because he is a friend of Bob in Facebook, resulting in F.Hugh7 being added to the system, and F.Hugh7's network in Facebook is also recorded (Carl and Lee2). It should be noted, that this example assumes that the system is not symmetrical, that is, a friend of a user does not imply that friend has user as a friend. Or simply put, just because Hugh is a friend of Bob does not mean that Bob is a friend of Hugh. In another embodiment, the relationships are symmetrical, and in our example it would mean that Bob would be added as one of the friends of Hugh7 because Hugh7 is a friend of Bob.

In another embodiment, users can identify their friends when registering if the crawler does not have access to existing relationships in the social networks. In another embodiment, the user provides the password used for each of the different identities to enable the crawler to access their information in the social network.

In addition to the User Metadata, the user also collects UGC 508 via Crawler 506, as described previously. The content is correlated to the owners according to the identities and relationships available in user metadata 504.

Figure 7:
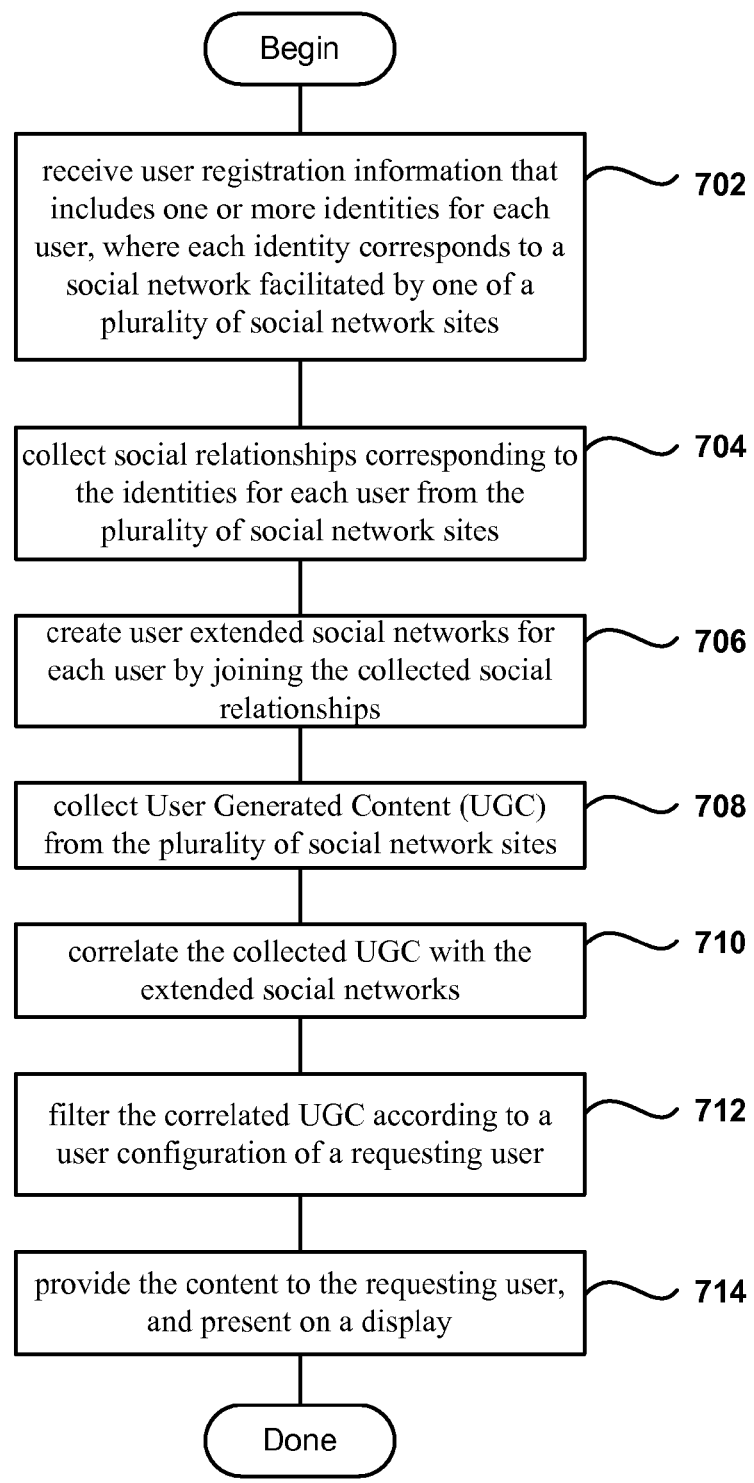
FIG. 7 shows the process flow for accessing trusted UGC in accordance with one embodiment of the invention.

FIG. 7 shows the process flow for accessing trusted UGC in accordance with one embodiment of the invention. In operation 702, the user registration is received, such as for example the process previously described with respect to FIG. 6. The registration information includes one or more identities for each user in the different social networks. The social networks are hosted by social network sites, as shown in servers 112, 114, and 116 from FIG. 1.

In operation 704, a crawler collects the social relationships corresponding to the identities registered in operation 702 by accessing the social network sites. The collected information is processed in operation 706 and extended social networks are created, as previously described with respect to user metadata 504 in FIGS. 5 and 6.

The crawler collects UGC in operation 708 by accessing the social network sites. As previously mentioned, the crawler may use an API or a brute force scan to gather the UGC. In operation 710, the user information and the UGC collected is correlated, attributing authorship to registered users independently of where the content was created, and giving access to other users, independently of where their social relationship was established.

Users define what kind of UGC they wish to access and the UGC is filtered according to their definitions in operation 712. Access can be made on demand, or feeds of information can be delivered to requesting users periodically. The filtered content is then presented to the requesting user in operation 714, such as for example in a browser window of the user's computer.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method to access trusted user generated content (UGC), the method comprising:
    receiving user registration information, the registration information including one or more identities for each user, each identity corresponding to a social network that is facilitated by one of a plurality of social network sites;
    collecting social relationships corresponding to the identities for each user from the plurality of social network sites;
    creating user extended social networks for each user by joining the collected social relationships, wherein an unregistered user is associated with an identity of the unregistered user in the one of the plurality of social network sites;
    collecting UGC from the plurality of social network sites;
    correlating the collected UGC with the extended social networks to identify an author of the UGC;
    filtering the correlated UGC according to access rules defined by a requesting user and according to share rules defined by the author of the UGC, wherein the access rules and the share rules are defined in any of the plurality of social network sites of the author; and
    providing the UGC to the requesting user, the UGC being available for presentation on a display.

2. The method as recited in claim 1, wherein receiving user registration information further includes,
    receiving a user ID for each identity, and
    collecting a password associated with the user ID if the user provides the password.

3. The method as recited in claim 1, wherein collecting social relationships further includes,
    collecting existing user social relationships in each social network site.

4. The method as recited in claim 1, wherein creating user extended social networks further includes one of,
    expanding an existing social network to include the collected social relationships and UGC, or
    creating a new social network to manage the user extended social networks.

5. The method as recited in claim 1, wherein collecting UGC further includes,
    collecting only content allowed by the content's owner.

6. The method as recited in claim 1, wherein collecting UGC further includes using a web crawl algorithm to collect social network site content.

7. The method as recited in claim 1, wherein collecting UGC further includes using an Application Programming Interface (API) to collect social network site content.

8. The method as recited in claim 1, wherein the UGC is one of ratings, reviews or wish lists.

9. The method as recited in claim 1, wherein the UGC contains information regarding at least one topic from the group consisting of,
    travel, restaurants, shopping, products, services, community, politics, employment, or website.

10. The method as recited in claim 1, wherein correlating further includes,
    associating each item of collected UGC with all the identities registered for a user that authored the item.

11. The method as recited in claim 1, wherein filtering the correlated UGC further includes sharing UGC according to privacy options of an authoring user, the privacy options being selected from a group consisting of content selection, target users, or authorship identification.

12. The method as recited in claim 1, wherein filtering the correlated UGC further includes imposing restrictions on specific UGC that can not be shared according to privacy options of the author of the UGC.

13. The method as recited in claim 1, wherein filtering the correlated UGC further includes using search parameters to filter the UGC.

14. The method as recited in claim 1, wherein providing content further includes,
accessing content on demand, and
using search parameters to filter information.

15. The method as recited in claim 1, wherein providing content further includes,
receiving a request from the requesting user to subscribe to a service that feeds content,
filtering the feeds content according to the access rules, and
presenting the filtered feed content.

16. The method as recited in claim 1, wherein providing content further includes giving recommendations from authors with similar preferences as those preferences from the user.

17. The method as recited in claim 1 further including,
providing behavioral data obtained from the extended social network.

18. A computer program embedded in a computer-readable storage medium, when executed by one or more processors, for accessing trusted UGC, the computer program comprising:
computer code for receiving user registration information, the registration information including one or more identities for each user, each identity corresponding to a social network that is facilitated by one of a plurality of social network sites;
computer code for collecting social relationships corresponding to the identities for each user from the plurality of social network sites;
computer code for creating user extended social networks for each user by joining the collected social relationships, wherein an unregistered user is associated with an identity of the unregistered user in the one of the plurality of social network sites;
computer code for collecting UGC from the plurality of social network sites;
computer code for correlating the collected UGC with the extended social networks to identify an author of the UGC;
computer code for collecting user privacy preferences for sharing;
computer code for filtering the correlated UGC according to access rules defined by a requesting user and according to share rules defined by the author of the UGC, wherein the access rules and the share rules are defined in any of the plurality of social network sites of the author; and
computer code for providing the UGC to the requesting user, the UGC being available for presentation on a display.

19. The computer program as recited in claim 18, wherein the computer code for collecting UGC further includes using an Application Programming Interface (API) to collect social network site content.

20. The computer program as recited in claim 18, wherein the computer code for correlating further includes associating each item of collected UGC with all the identities registered for a user that authored the item.

21. A system to access trusted UGC, the system comprising:
a plurality of social network sites;
a registration server having a processor to receive user registration information, the registration information including one or more identities for each user, each identity corresponding to a social network that is facilitated by one of the plurality of social network sites;
a crawler that collects UGC and social relationships corresponding to the identities for each user from the plurality of social network sites;
a user metadata database including user extended social networks for each user and user privacy preferences, the user extended social networks being created by joining the collected social relationships, the collected UGC being correlated with the extended social networks, wherein an unregistered user is associated with an identity of the unregistered user in the one of the plurality of social network sites;
a user content database including the UGC obtained by the crawler;
a search engine to filter the correlated UGC according to access rules defined by a requesting user, the access rules being defined in any of the plurality of social network sites of the requesting user; and
a display to provide the UGC to the requesting user.

22. The system as recited in claim 21, further including
a subscription server to enable users to subscribe to a service that feeds content, the feeds content being filtered according to the access rules and presented to the requesting user after being filtered.

23. The system as recited in claim 21, wherein the crawler collects existing user social relationships in each social network site.

24. The system as recited in claim 21, wherein the crawler collects UGC using a web crawl algorithm to collect social network site content.

25. The system as recited in claim 21, wherein the UGC contains information regarding at least one topic from the group consisting of,
travel, restaurants, shopping, products, services, community, politics, employment, or website.

* * * * *